United States Patent

Aoyagi et al.

[11] Patent Number: 5,809,635
[45] Date of Patent: Sep. 22, 1998

[54] METHOD FOR FIXEDLY ATTACHING COVERED WIRES TO A HEAD SUSPENSION LOAD BEAM

[75] Inventors: Akihiko Aoyagi; Hiroshi Terashima; Kyoji Igarashi; Masatoshi Take, all of Fujisawa, Japan

[73] Assignee: International Business Machines Corporation, Armonk, N.Y.

[21] Appl. No.: 940,468

[22] Filed: Sep. 30, 1997

Related U.S. Application Data

[60] Continuation of Ser. No. 455,576, May 31, 1995, abandoned, which is a division of Ser. No. 275,164, Jul. 14, 1994, abandoned.

[30] Foreign Application Priority Data

Jul. 16, 1993 [JP] Japan .................................... 5-176642

[51] Int. Cl.⁶ .......................... G11B 5/127; H01R 43/027; H01R 43/04
[52] U.S. Cl. ............................ 29/603.06; 29/858; 29/862; 156/158; 174/76; 264/272.13
[58] Field of Search ........................... 29/603.01, 603.06, 29/855, 856, 858, 868, 862; 156/157, 158; 174/76, 77 R; 264/272.11, 272.13, 272.14, 272.15

[56] References Cited

U.S. PATENT DOCUMENTS

| | | | |
|---|---|---|---|
| 3,384,881 | 5/1968 | Frost et al. ........................ | 29/603.06 X |
| 3,488,838 | 1/1970 | Steneel, Jr. et al. ................. | 29/603.06 |
| 3,550,765 | 12/1970 | Anderson ........................ | 264/272.11 X |
| 3,597,528 | 8/1971 | Penfield et al. ........................ | 174/76 X |
| 3,607,507 | 9/1971 | Enos ......................................... | 156/158 |
| 4,220,619 | 9/1980 | Kersten ................................. | 156/158 X |
| 4,814,028 | 3/1989 | Sawaki et al. .................. | 264/272.14 X |
| 4,963,698 | 10/1990 | Chang et al. .......................... | 29/868 X |
| 5,021,611 | 6/1991 | Amano ................................... | 29/868 X |
| 5,140,746 | 8/1992 | Debbaut ................................ | 29/858 X |

FOREIGN PATENT DOCUMENTS

| | | | |
|---|---|---|---|
| 0434261A | 6/1991 | European Pat. Off. . | |
| 34280 | 2/1991 | Japan ........................................ | 29/868 |
| 2023477 | 1/1980 | United Kingdom ..................... | 29/868 |

*Primary Examiner*—Peter Vo
*Attorney, Agent, or Firm*—Matthew J. Bussan; Schmeiser, Olsen & Watts

[57] ABSTRACT

A method for fixedly attaching covered wires to a load beam during the manufacturing of a head suspension assembly in order to provide an electrical connection to a head slider. The method includes the steps of passing the covered wires through a transparent tube, inserting a filler into the tube at a point where clamping is required, curing the filler, visually identifying the filer location, and clamping the tube at the filer location.

5 Claims, 4 Drawing Sheets

METHOD FOR FIXEDLY ATTACHING COVERED WIRES TO A HEAD SUSPENSION LOAD BEAM

This application is a continuation, of application Ser. No. 08/455,576, filed May 31, 1995, now abandoned which is a division of Ser. No. 08/275,164 filed on Jul. 14, 1994, now abandoned.

BACKGROUND OF THE INVENTION

1. Field of the Invention

The present invention relates to a head suspension assembly, such as those used in magnetic disk units, particularly to a head suspension assembly wherein a tube, through which pass a plurality of covered wires is clamped, and a manufacturing method thereof.

2. Description of the Related Art

In a head suspension assembly used in magnetic disk units shown in FIG. 2(a), a tube 5, (having a plurality of covered wires 4 passing therethrough which connect with a head slider), is fixed and clamped by claw claw sections 6, on the side of a mount plate 3, which is connected with a head actuator (not illustrated). FIG. 2(b) is an enlarged drawing thereof. The tube 5 is fixed by clamping such a claw section 6, thereby fixing the covered wires inserted into the tube 5 so that they do not move. This is done for the following reasons. That is, as shown in FIG. 3(a), there is normally a fairly large space between the tube 5 and the covered wires 4 because the covered wires 4 are thinner compared to the inside diameter of the tube 5. Therefore, as shown in FIG. 3(b), the friction force between the tube 5 and the covered wires 4 is not increased unless the tube 5 is clamped sufficiently, with the result that the covered wires 4 move easily when pulled.

There is another method for fixing the covered wires 4 so that they not easily moved when pulled. As shown in FIGS. 4(a) and 4(b), in some cases adhesive is applied to the covered wires 4 and hardened in a ball shape 9 on the side where the head slider 1 in the head suspension assembly is connected, so that ball 9 of this adhesive is caught at the head of the tube 5 even if the covered wires 4 are pulled from the mount plate side, thereby preventing the covered wires 4 from moving.

Moreover, although it is not a head suspension assembly in which the covered wires are fixed by clamping the tube to prevent the covered wires in the tube from moving, in Japanese PEPA No. 2-40205, a fixture section 14 is formed on a lead wire 13 which is inserted into a through hole 12 of a cylindrical ferrite bead 11, a liquid adhesive 15 is applied to the fixture section 14 (see FIG. 5). The fixture section 14 is inserted in the through hole 12 so as to form a capillary gap 16 between the through hole 12 and the lead wire 13 (see FIG. 6), and then, the adhesive 15 is heated to a lower viscosity, and the adhesive 15 is infiltrated into the through hole 12 from outside by capillary action using the capillary gap 16 so as to fill in the through hole 12 (see FIG. 7).

An element assembly of electronic parts such as this ferrite bead might be broken if clamped. Thus, in such a technique as disclosed in Japanese PEPA No. 2-40205, it is not possible to fix lead wires by clamping so that lead wires in a through hole do not move. Therefore, this method is not suitable for practical use where clamping is utilized.

In a conventional method where a tube is clamped to fix covered wires therein so that they do not move, if a claw section is clamped too then, a crack is produced on the tube or the covered wires may be cut or short-circuited. Such a crack or short-circuit renders the manufactured head suspension assembly unusable.

On the other hand, if the claw section is insufficiently clamped, this may avoid such problems, but the covered wires in the tube are not fixed securely, and move easily. Therefore, the covered wires will move easily when they are pulled at the time of soldering, resulting in deformation of the head suspension assembly. If deformations arise in this loop shape, then the flying height, which is the most important parameter of the head suspension assembly, will be changed. Therefore, the yield of the products using a head suspension assembly such as a magnetic disk unit will decrease.

Moreover, the method of forming a ball of adhesive at the head of covered wires on the slider side has a disadvantage in that the position and size of the ball of adhesive must be accurately controlled. This is because unevenness has a bad influence directly onto the loop shape of the covered wires. As a result, the flying height, will be changed and problems arise, such as the decreased yield of products using a head suspension assembly, (e.g., magnetic disk units).

As stated above, in a head suspension assembly, it is not possible by conventional methods to fix the covered wires inserted into a tube so that they do not move, or even if it were possible to carry out, problems arose, and these methods were not suitable for practical use.

SUMMARY OF THE INVENTION

An object of the present invention is to provide a head suspension assembly in which covered wires passing through a tube are fixed firmly by a slight clamping of the tube and a manufacturing method thereof.

This and other objects of the present invention are attained by filling a space between the tube and the covered wires with filler and clamping that part of the tube containing the filler. In this way, a large friction force is generated between the filler and the covered wires, and the covered wires are fixed firmly.

In a head suspension assembly according to the present invention, the filler is filled in a space between a plurality of covered wires and the tube which the covered wires pass through, and the part of the tube containing the filler is clamped by securing means.

The securing means is preferably a claw section provided in the head suspension assembly. In this case, it is not necessary to attach the securing means to the head suspension assembly. Therefore, the cost of the head suspension assembly is reduced.

It is desirable that the tube is able to transmit light and the filler is cured by light. In such a case, the filler is cured by light at an ordinary temperature. Therefore, disadvantages caused by curing of the filler by heating can be eliminated. That is, problems of gaseous materials coming out from the filler and tube by heat, sticking to the tube, and remaining in it, thus becoming a contamination source of magnetic disks and the like, and of the tube being extended or contracted when it is heated too much because the heat-resistant temperature of the tube itself is low (about a little less than 100 degrees C.) are eliminated. In addition, since the position of the filler in the tube can be checked from the outside, the portion to be clamped is known easily and accurately. In particular, if the filler is colored, the position of the filler is checked more easily.

In the method of manufacturing a head suspension assembly according to the present invention, after a plurality of covered wires are inserted into a tube, liquid filler is filled into a space between the covered wires and the tube, and cured. The part of the tube where the filler is filled in is clamped by the securing means.

Clamping of the tube by the securing means is preferably carried out by a claw section provided on the head suspension assembly. This makes the manufacturing of the head suspension assembly easier because it is not necessary to attach a fixing means to a head suspension assembly separately.

It is desirable that material which is to transmit light be used for the tube. In addition, a material which can be cured by light should be used for the filler. Further, should and the curing of the filler be carried out by irradiating light onto the filler. In this way, as stated above, the filler is cured by light at an ordinary temperature. Therefore, the disadvantages caused by heating the filler are eliminated. In addition, since the position on the filler in the tube can be checked from outside, the part of the tube to be clamped is known easily and accurately, thereby making manufacturing of a head suspension assembly easier.

DESCRIPTION OF THE PREFERRED EMBODIMENT

An embodiment of the present invention is explained below with reference to drawings.

Figure 1A:
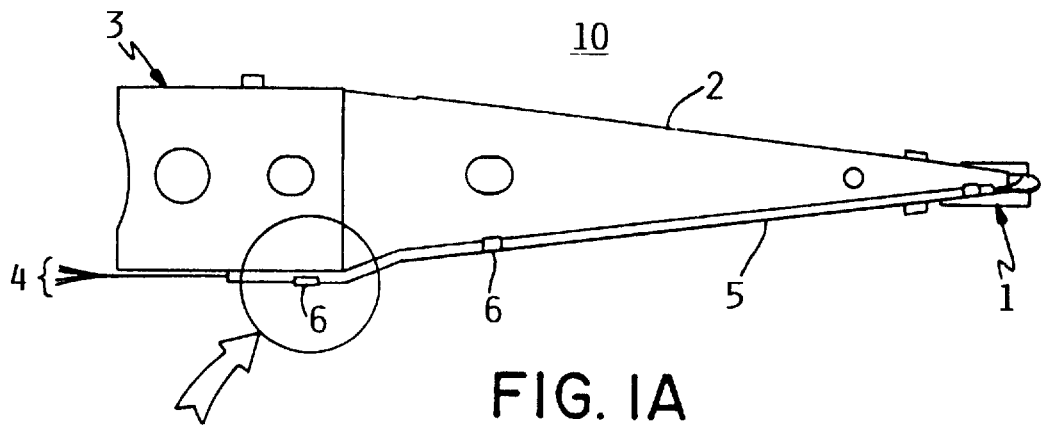
FIGS. 1(a)–1(d) show an embodiment of a head suspension assembly according to the present invention.
Figure 1B:
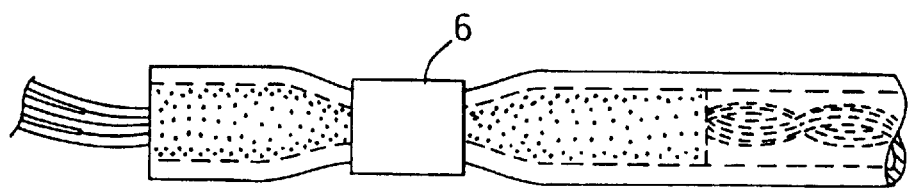
Figure 1C:
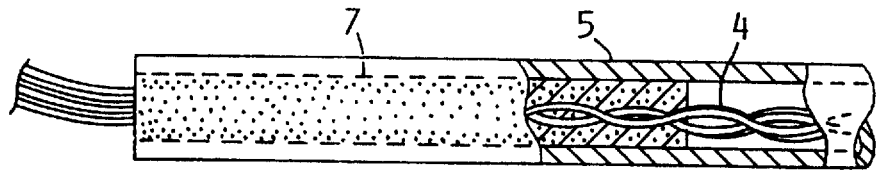
Figure 1D:
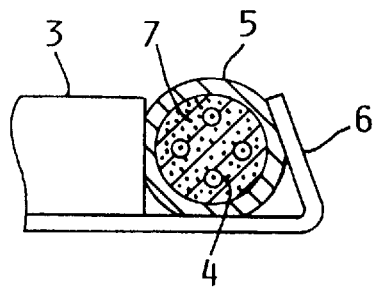
Figure 2A:
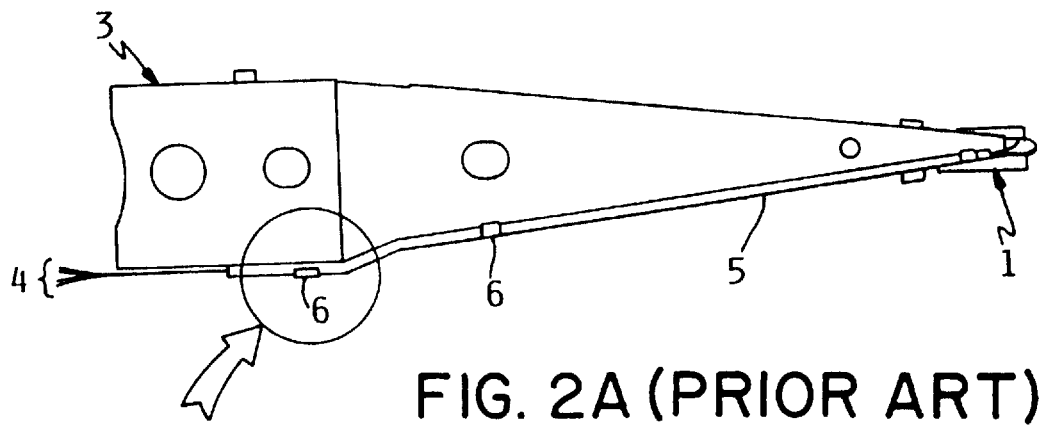
FIGS. 2(a) and 2(b) show an example of a conventional head suspension assembly which is used in magnetic disk units.
Figure 2B:
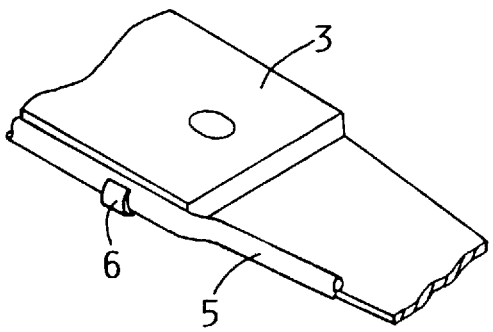
Figure 3A:
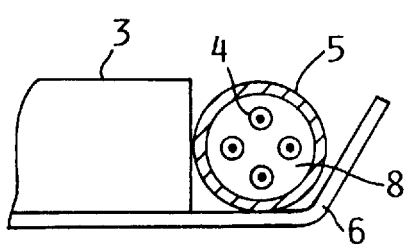
FIGS. 3(a) and 3(b) show a conventional method for fixing covered wires in a head suspension assembly.
Figure 3B:
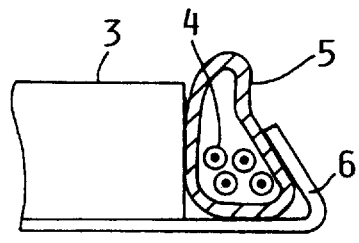
Figure 4A:
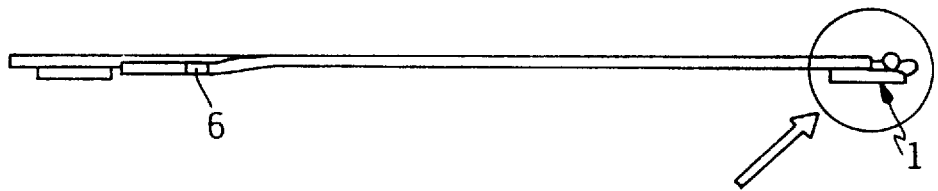
FIGS. 4(a) and 4(b) show another conventional method for fixing covered wires in a head suspension assembly.
Figure 4B:
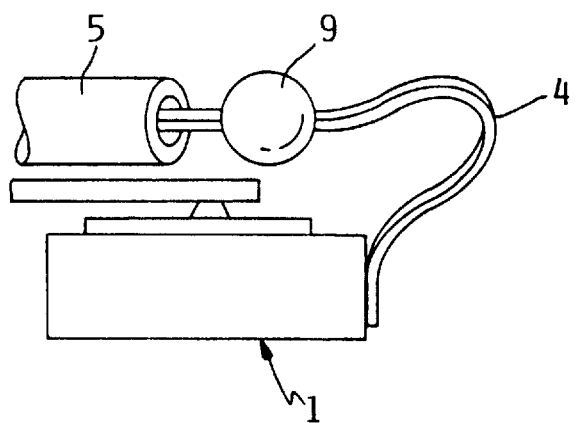
Figure 5:
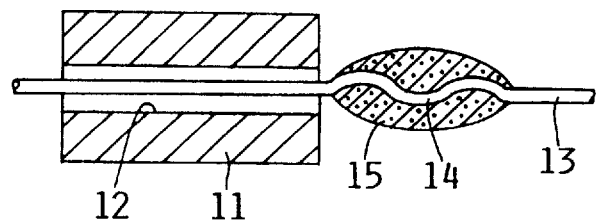
FIGS. 5–7 show a conventional method for manufacturing electronic parts.
Figure 6:
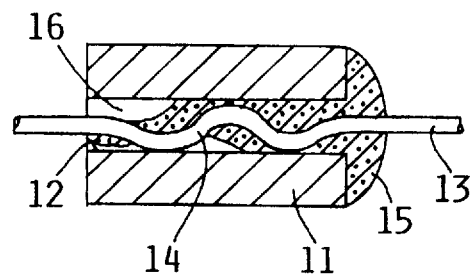
Figure 7:
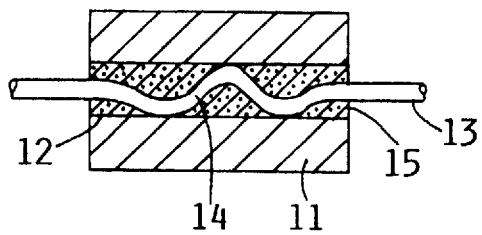

FIG. 1(a) through 1(d) show an embodiment of a head suspension assembly 10 according to the present invention. FIG. 1(a) is a plain view of head suspension assembly 10. The suspension assembly 10 consists of a head slider 1 for writing and reading data, a load beam 2, a mount plate 3, a tube 5 through which pass a plurality of covered (insulated) wires 4, and a claw section 6 for clamping the tube 5. FIG. 1(b) is an enlarged drawing of the section of the tube 5 which is clamped by the claw section 6 on the side of the mount plate 3. FIGS. 1(c) and 1(d) are a vertical section view and a transverse sectional view of the section of tube 5 shown in FIG. 1(b), respectively. As understood from FIGS. 1(b) and (d), filler 7 is filled in the part of the tube to be clamped and the covered wires 4 are firmly fixed by a slight clamping on the tube 5.

Any kind of tube may be used if it is not broken by clamping. For example, Teflon (a brand name of E. I. du Pont de Nemours and Co.) may be used. Moreover, any kind of filler can be used if it is a liquid material which can be cured and does not corrode the tube and covered wires. For example, plastic which can be cured by ultraviolet light is preferable.

Such a filler is filled in the tube by pouring it into the tube from the opening of an end of the tube at room temperature after the covered wires have been inserted into the tube. When the filler is dripped from the opening, the filler pours into the tube by itself by capillary action. Therefore, the filling work is very simple. This filling work can be performed quickly by pushing the filler into the tube by applying pressure.

The tube, which is filled with filler, is irradiated by ultraviolet light. Since the tube transmits ultraviolet light, the filler contained in the tube is cured. Then the part of the tube that is filled with filler is clamped by securing means, such as a claw section, attached to the head suspension assembly.

In the execution of the present invention, especially in cases where the tube is transparent or semi-transparent, the portion where the filler is filled is known. Therefore, the process of clamping a tube by a securing means becomes easy. Moreover, in cases where the filler does not stick to the tube, fine adjustment can be made by slightly shifting the clamping position of the tube and covered wires in the lateral direction after the filler is filled into the tube and cured. Therefore, the loop shape of the covered wires at the head of the head suspension assembly can be optimized and it is possible to finish it into a head suspension assembly, the flying height of which is designed precisely.

When the present invention is executed, the loop shape of the covered wires at the head of the head suspension assembly may be kept constant at all times because the covered wires do not move even if they are pulled in order to connect the covered wires fixed on the head suspension assembly with a flexible cable routed near the head suspension assembly by soldering or the like.

Moreover, when the present invention is executed, problems caused in the conventional method, that is, inability to fix the covered wires firmly even though the tube is clamped to fix to the head suspension assembly, or breakage of the covered wires, short-circuit, or cracks generated in the tube, may be solved.

In a head suspension assembly according to the present invention, covered wires passing through a tube are firmly fixed by a slight clamping of the tube.

What is claimed is:

1. A method for fixedly attaching covered wires to a load beam during the manufacturing of a head suspension assembly, said covered wires providing an electrical connection to a head slider that is to be mounted to the load beam, said method comprising the steps of:

passing the covered wires through a tube;

inserting a filler in a space between said tube and the covered wires within a portion of said tube at a point where clamping is required for attaching said covered wires to said load beam;

curing said filler in said portion of said tube;

visually identifying said point wherein said filler was inserted; and clamping said tube to said load beam at said point wherein said filler was inserted.

2. The method as recited in claim 1, wherein:

said step of clamping said portion of said tube to the load beam includes the substep of deforming a claw section of the load beam.

3. The method as recited in claim 1, wherein said tube can transmit light and said filler can be cured by light transmitted through said tube, said step of curing said filler in said portion of said tube including the substep of:

irradiating light on said portion of said tube.

4. The method as recited in claim 3, wherein said light is ultraviolet light.

5. The method of claim 1 wherein said filler is a colored filler utilized to enhance said visual identifying step.

* * * * *

UNITED STATES PATENT AND TRADEMARK OFFICE
CERTIFICATE OF CORRECTION

PATENT NO.   : 5,809,635
DATED        : September 22, 1998
INVENTOR(S)  : Akihiko Aoyagi et al It is certified that error appears in the above-identified patent and that said Letters Patent is hereby corrected as shown below:

IN THE ABSTRACT

"identifying the filer location, and clamping the tube at the filer location" should be --identifying the filler location, and clamping the tube at the filler location--.

Signed and Sealed this

Twenty-sixth Day of January, 1999

Attest:

Attesting Officer

Acting Commissioner of Patents and Trademarks